United States Patent [19]
Neuhoff

[11] 4,067,052
[45] Jan. 3, 1978

[54] PROCESS FOR DETECTING ELECTRICAL FAULTS

[76] Inventor: Charles J. Neuhoff, R.D. 5 Delta Lane, Johnstown, Pa. 15905

[21] Appl. No.: 682,349

[22] Filed: May 3, 1976

Related U.S. Application Data

[63] Continuation-in-part of Ser. No. 490,020, July 19, 1974, abandoned.

[51] Int. Cl.² ............................................. H02H 3/16
[52] U.S. Cl. ........................................ 361/42; 361/47
[58] Field of Search ................... 317/9 R, 9 A, 9 AC, 317/124; 250/206, 227; 340/237 S, 228 R, 228 S, 380, 419; 361/1, 42, 47

[56] References Cited
U.S. PATENT DOCUMENTS

| | | | |
|---|---|---|---|
| 2,043,099 | 6/1936 | Hanna | 317/9 R |
| 3,374,950 | 3/1968 | Menzel et al. | 250/227 X |
| 3,541,539 | 11/1970 | Trumble | 340/227 R |
| 3,774,044 | 11/1973 | Langeron | 340/237 S |

OTHER PUBLICATIONS
Popular Science Monthly, Nov. 1932.

*Primary Examiner*—Harry E. Moose, Jr.
*Attorney, Agent, or Firm*—Sidney W. Millard

[57] ABSTRACT

Process and apparatus for detecting electrical phase to ground or phase to phase fault currents occuring in enclosures retaining electric switch gear, switchboards, panel boards, and the like providing ionization chamber sensing of the particulate and/or ionized matter generated by the electrical fault, and generating a signal as a result of the parameter. The signal is transmitted to a means for opening the circuit and the circuit is opened to stop further current flow and damage to the devices to which it is connected. Audio or visual alarms as well as sensor status readouts may also be used with the invention.

11 Claims, 7 Drawing Figures

PROCESS FOR DETECTING ELECTRICAL FAULTS

RELATED APPLICATIONS

The present application is a continuation in part of United States application for letters patent Ser. No. 490,020, filed July 19, 1974, for "Grounding and Phase to Phase Fault Current Detection", now abandoned.

BACKGROUND OF THE INVENTION

1. Field of the Invention

The invention relates to a system for protecting electrical switchgear, switchboards, panelboards, motor controls and other electric equipment from arcing faults.

2. Description of the Prior Art

In electrical equipment arcing faults may occur due to loose connections, conductive dust accumulation on insulators, insulation failure due to overloading and unsuccessful interruption of short circuits causing conductive gases to emanate from circuit breakers or fuses. Such faults are very turbulent in that the energy released by the arc can generate a tremendous amount of heat and arc pressures in a matter of a few cycles. A copper or aluminum bus and its grounded parts can quickly be melted away if these faults are allowed to persist beyond the very narrow time frame representing the incipient stage thereof. The fault may occur as phase to phase or phase to ground, depending upon the cause.

The need for adequate fault detection and instantaneous warning apparatus is well recognized within the industry, as noted in a publication entitled *Electrical Construction and Maintenance* June 1973, pp. 53–72, the disclosure of which is hereby incorporated by reference. By way of illustration, the following passage is quoted from page 53:

"Under normal conditions, all current supplied by a transformer or network bus to a system returns to the source through the phase and neutral conductors. Current returning by any other path—through ground or through the system grounding conductor—indicates a lead from phase to ground somewhere on the system. Such a leak can be caused by insulation deterioration, moisture, dust or other contaminants, damage to the equipment, or human error. While the fault current may be too small to trip the system's overcurrent protective devices, arcing at the point of fault can generate high temperatures and result in serious damage to equipment within a very short time."

The problem of fault detection is especially acute on low volatage systems. If an arc circuit impedance is high the current fluctuation is very low and difficult to detect. Different types of devices are presently used in the art to detect low-voltage electrical ground to phase faults. Among the ground to phase protection devices are broken-delta ground fault protection, ground sensor protection, ground return protection, and residual ground fault protection. The broken-delta device relies upon the measurement of voltage across broken delta-connected current sensors. In this arrangement a voltage will appear across the broken delta only when a ground fault develops in the system. The ground-sensor protector is based on a combination of a donut-type current transformer which surrounds all three or four outgoing conductors and a specific over current relay. The current transformer produces an output proportional to the ground fault component of the total outgoing current. The ground return protection mechanism relies on a baror donut-type current transformer and a conventional relay. The current transformer measures the ground fault current as it returns to the source of power. Finally, the residual ground fault protector measures the outgoing ground fault current in the residual circuit of three phase current transformers. Each of these protection devices has its own particular advantages and limitations. But all of them share the same limitation of relying on electrical changes in the equipment to activate the means such as a relay for opening the circuit to stop current flow.

Because the prior art protection devices rely on current sensing, there must be sufficient current change to activate them. However, the current magnitude of arcing faults may be so small that the usual phase overcurrent protection does not respond at all or only after a considerable time delay. This is particularly true where the current load is large; in such cases the degree of current changes with a fault may be too small for existing equipment to detect as a fault, i.e., current sensing systems lack the capability to respond quickly enough. To prevent damage to the equipment, the monitoring techniques should respond to incipient fault failure, for example, within a few seconds of time.

Present breakers may also be ineffective when applied to switches or circuit breakers having motors or similar devices which are not functional below a given voltage. Since the possibility exists that a phase to ground or phase to phase fault could pyramid or cascade to levels which would reduce the system operating voltage below the given voltage, these devices have not been effective in some circumstances and it often occurs that the electrical equipment to which they are attached suffers severe, either heat, fire or smoke damage before the electrical faults are detected and the circuit is shut off.

SUMMARY

This invention recognizes that in order to avoid substantial damage to electrical equipment, the electrical faults, whether ground to phase or phase to phase, must be detected at the earliest possible time, i.e., during incipient failure. Accordingly, the invention proposes to detect certain preliminary phenomena of an incipient electrical fault and to respond to that preliminary phenomena to quickly open the input powering circuit and/or sound an alarm.

In accordance with the invention, the presence of an arcing fault in electrical equipment is detected by a process which senses a particular phenomena in the environment about the electrical equipment. The invention recognizes that particulate and/or ionized matter is generated by the arcing fault. An ionization chamber type sensing device located within the enclosure of the electrical equipment is capable of responding thereto at an unusually high rate of response. Accordingly, arc faults may be sensed at the incipient stage of a failure to generate an electrical signal to open a circuit breaker and thereby protect the electrical equipment. An alarm system may also be activated by the same signal. As a further aspect, inasmuch as ionization surveillance is carried out within an enclosure normally fully enclosing and thereby substantially stabilizing the atmospheric environment of the electrical equipment, further advantageous enhancement of sensing response is realized.

In another embodiment, the light emanating from the arc produced by the fault is the sensed parameter. The light may be detected by a light detecting means such as a cesium photoelectric cell. The light detecting means may be the type that either produces electrons or changes resistance in the presence of light. And the light detecting means may be connected to an amplifying device which amplifies the effect of the change in resistance or the electrons produced and activates a relay that opens the protected circuit and/or an alarm.

The light sensing embodiment may be modified so that the light detecting means is located at a remote location from the electrical equipment. It is possible to conduct the light emanating from the arcing fault to the light detecting means by means of a bundle of optic fibers. Also, several separate bundles of fiber optics may be used to connect different potential arcing fault locations to a single light detection means.

Other objects of the invention will, in part, be obvious and will, in part, appear hereinafter.

The invention, accordingly, comprises the process and system possessing the method steps, combination of elements and arrangements of parts which are exemplified in the following detailed disclosure.

For a fuller understanding of the nature and objects of the invention, reference should be had to the following detailed description taken in conjunction with the accompanying drawings.

DETAILED DESCRIPTION

As discussed in detail above, the preferred embodiment of the present invention is addressed to a technique for detecting an arcing fault at the incipient stage thereof. At such stage of electronic or electrical component degeneration, arcing will have just commenced and damage to faulting electrical equipment, as well as components in the immediate surroundings, will be substantially negligible. Under many fault conditions, for instance, high resistance, phase-to-phase arcing faults, conventional fault detecting techniques are unsatisfactory. By enjoying a capability for an unusually rapid sensing of a fault by-product, the present arrangement is capable of overcoming the disadvantages of prior approaches to the detection problem. The instant technique looks first to the nature of initial stage arcing during an incipient fault interval to discover a particular aspect of its by-product. For instance, it is readily observed that aerosols are generated in consequence of the heat-induced generation of insulative materials and the like. However, in addition to these aerosols, the arcing phenomena itself engenders ionized particulate matter. By providing surveillance of the environment of the electrical components utilizing ionization chamber techniques, advantage is taken of the dual component aspect of the arcing by-product, and a monitoring arrangement capable of detecting and responding to the particular by-products of arcing at the critical incipient failure stage is provided.

Figure 1:
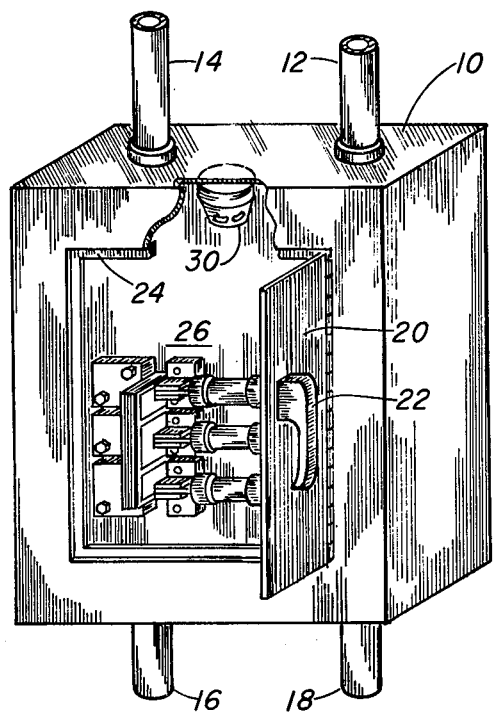
FIG. 1 is a pictorial view of a fault surveillance arrangement of the invention, showing the environment of its intended use.

To more clearly portray the particular environment to which the invention is addressed, FIG. 1 pictorially represents a typical electrical installation utilized, for instance, in highrise buildings and commercial enterprises. Referring to that figure, a rectangularly shaped metal cabinet is represented generally at 10. Such cabinets are available in a wide variety of sizes and shapes and very often are assembled in banks and rows within a sequestered room or area of an industrial or commercial facility. Power and/or communication transmitting cables are introduced into the cabinet in shielded fashion through pipes or conduits as are represented, for instance, at 12–18. Cabinet 10 is fabricated as an enclosure and, accordingly incorporates a hinged door, as is exemplified at 20, having a manually manipulatable latch, the handle portion of which is revealed at 22. When door 20 is closed, as is normally the case, the atmospheric air therewithin is fully enclosed and is in a substantially stable state. Note, to provide appropriate enclosure, such cabinets as at 10 generally will be fabricated having a flange or lip portion as revealed at 24 which may be observed to enhance the noted stability of the atmospheric environment therewithin. Within cabinet 10 any of a wide variety of electrical components are enclosed, for instance, fuse and switching components are revealed somewhat schematically and in general fashion at 26. It further may be observed that it is the practice of the industry to configure and dimension the enclosures as at cabinet 10 to provide a volumetric capacity substantially suited only for enclosing and retaining those electrical components 26 required for the particular electrical application, i.e., a somewhat compact environment for them is provided. This aspect stems from obvious practicalities of conserving space and in view of cost efficiencies.

In accordance with the preferred embodiment of the invention, the monitoring component provided within the enclosure of cabinet 10 is an ionization type aerosol detector, the outer housing of which is revealed at 30. Such detectors are readily available in the marketplace, for instance, as are described in U.S. Pat. Nos. 3,676,680 and 3,681,603 or are identified as models FDU-5B, 5DU-3/5A, DI-2S and DI-2F available from Pyrotronics, a division of Baker Industries, Inc., Cedar Knolls, New Jersey. Generally, such detectors are designed to respond to aerosols within an atmosphere, i.e., smoke, and through the use of a radioactive component, ionize particles of the aerosol to alter an electrical parameter and generate a warning signal. In the present application, however, it is opined that the rapid response received from the detectors may at least in significant part be attributed to the presence of ionized matter itself which is a by product of the arc phenomena. Rates of response, for example, within about three seconds of time of the generation of an arc may be realized to effect corrective procedures well before damage to equipment ensues. Further enhancing the response rate, however, is the particular environment of the container or cabinet 10 with door 20 in its normally closed orientation. Under such environmental conditions, wherein the atmospheric air enclosed within the cabinet is stabilized and confined, the aerosols and/or ionized material are more readily made available to the monitoring ionization chamber to provide even further assurance of a rapid rate of detection response suited to incipient fault detection.

Figure 2:
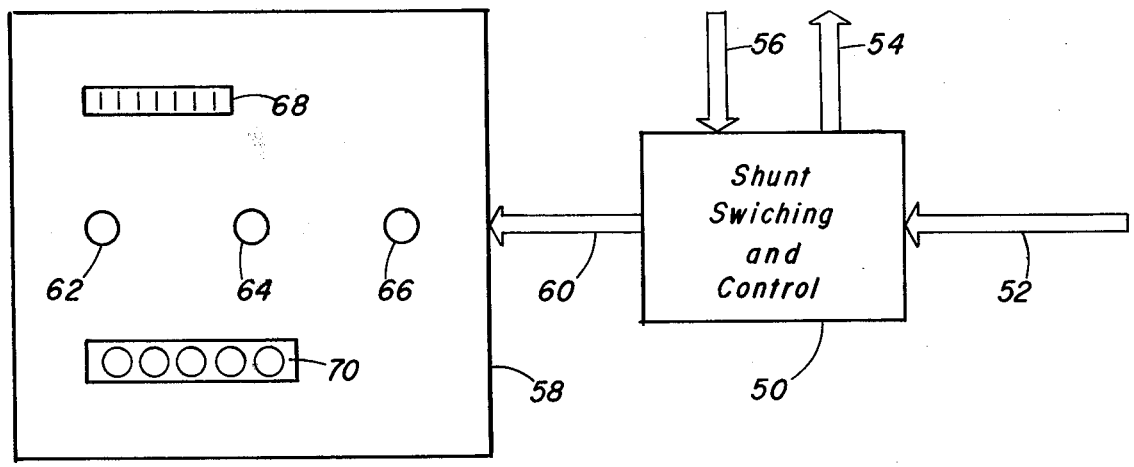
FIG. 2 is a schematic block diagrammatic representation of control and readout components of the surveillance arrangement of the invention.

Looking additionally to FIG. 2, a schematic block representation of the control and readout associated both with the electronic components within cabinet 10 and with ionization detector 30 are revealed. A shunt switching and control function is shown at block 50 as receiving a power input labeled and designated at 52. Next, through conventional power regulation and rectification circuits, input power is provided to detector 30 as well as introduced as main power into the components 26 of cabinet 10, as represented and labeled at 54. Surveillance feedback from detector 30 is provided as represented by the arrow at 56. Function 50 further includes appropriate relay actuated shunt tripping devices, i.e., breakers and the like, which are actuated in response to an alarm input at 56. With the detection of an incipient fault at cabinet 10, power input from 52 is shunted to shut down the equipment 26 within cabinet 10. The components for providing such control are, for instance, available from the noted pyrotronics division of the Baker Industries and are identified as models CR-1 or CR-1E. For purposes of assuring the integrity of the surveillance or monitoring system, the shunt tripping function as well as surveillance monitoring circuitry emanating from the ionization chamber at 30 preferably are located remotely of enclosure 10, otherwise the reliability of the monitoring installation is diminished by a recognizable factor. Also revealed in FIG. 2 is a readout station 58 connected, as through channel 60, with the logic and control circuitry of shunt switching and control block 50. This station serves to apprise the operator that power is being applied both to the monitoring ionization chamber 30 as well as into electrical components 26, such appraisal being read out as an illuminated lamp at 62 or other suitable indicia. On the occassion of a fault, for which shunt switching will have immediately taken corrective measures, a fault indicator provided as at 64 is energized.

Inasmuch as a residuum of ionized matter or aerosol may be present within the ionization chamber of the detector 30 for some period of time it is desirable that the operator be apprised of that point in time when detector 30 is capable of continuing monitoring operations from a properly reset condition. Accordingly, a clear output designation, as by lamp 66, is additionally supplied at readout 58. Until such indication of a clear ionization chamber is provided, as at 66, power would not be reasserted by the operator following the resetting of trip breakers and the like. Further, inasmuch as several monitor cabinets or stations may be involved, a multiplexing form of selection circuitry is provided. For instance, that station receiving an alarm or the like may be revealed by an appropriate numerically designated output as at 68. To minimize the on-time or ionization periods for the output indicia at readout 58, an interrogation feature may be provided wherein switches, as generally designated at 70, may be actuated by the operator to interrogate the status of each station.

Figure 3:
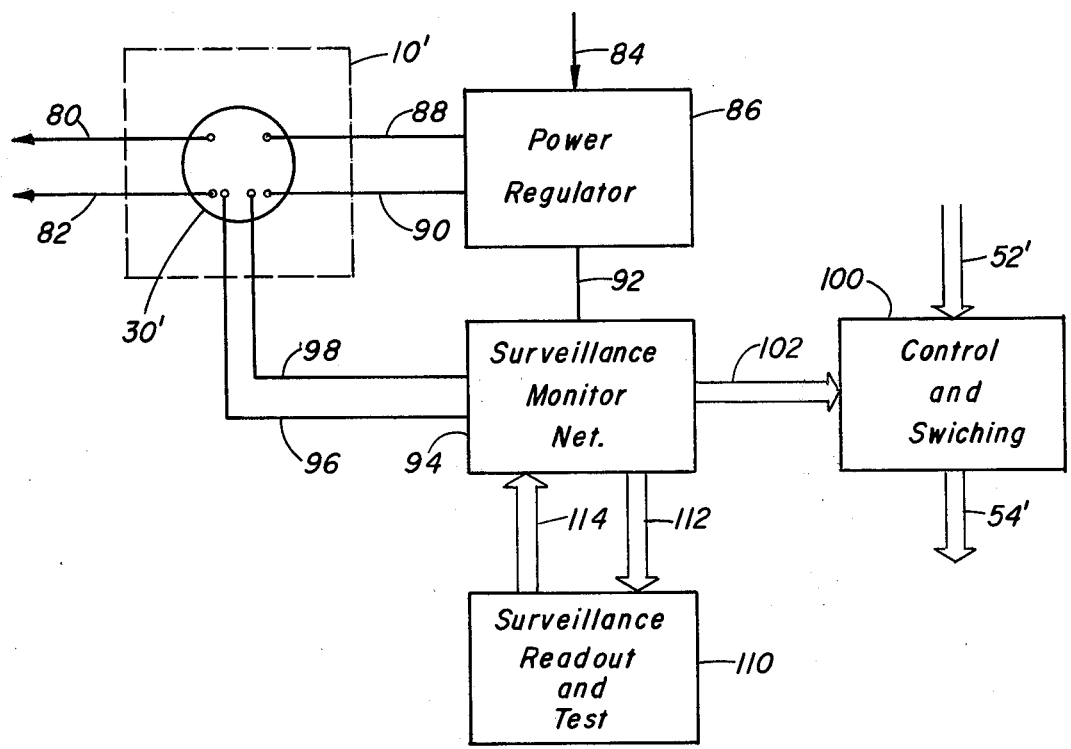
FIG. 3 is a schematic block diagramatic representation of certain control and readout aspects of the invention.

Looking to FIG. 3, a more detailed representation of the interrelationships of detector 30 with functions 50 and 58 is revealed. In the figure, the enclosure within which the electrical components and ionization detector are located is represented 10', while the ionization detector and terminals coupled thereto are represented at 30'. A grouping of such detectors may be provided, as indicated by arrow leads 80 and 82, to derive readouts from a plurality of cabinet contained detector installations. Power to the detectors 30' is provided from line 84 to a Power Regulator 86 which serves to derive a regulated and appropriate d.c. output as along lines 88 and 90 to appropriate terminals at detector 30'. A signal representing that power is supplied to the detector 30' is provided along line 92 to a surveillance monitor network as at 94. Network 94 also is coupled to receive alarm and clear signals from detector 30' through lines 96 and 98, it being understood that a plurality of such inputs would be introduced to network 94 from a corresponding number of detector installations. Upon the occurrence of an alarm condition, network 94 provides a signal input to a Control and Switching function represented at 100 through interconnections shown generally at 102. As represented earlier at FIG. 2, input from the power supply to function 100 is shown at 52', while the output thereof, having traversed the shunt trip components or breakers and the like, is represented at 54'. The surveillance readout and test features for the system are represented at 110 and are shown interconnected with monitor network 94 through conduits designated generally at 112 and 114. As discussed above, Surveillance Readout and Test function 110 serves to apprise the operator of a power "on" condition at any given monitoriing station as well as the presence or absence of a clear mode output signals or condition at detector 30', as well as an alarm mode output condition thereat. The breakers or shunt tripping components incorporated at Control and Switching function 100 may be any of many types available commercially, such as the QA-CDC or QA-ET electrically operated shunt trip switches manufactured by the Pringle Electrical Manufacturing Company of Fort Washington, Pennsylvania or the General Electric type AK Versatrip circuit breakers. The specific type of breaker or the like selected depends upon the electrical characteristics of the protected circuit and should be tailored to a particular installation. Amplification stages may be utilized with the circuit to accommodate for relatively weak detector generated signals. And, of course, various forms of audio-visual alarms may be incorporated within the readout function as well as at the point of installation of a particular sensing device.

A desirable redundancy of the monitoring arrangement may be provided by further incorporating within cabinet 10 a heat sensitive switch or similar thermostatic device as are generally commercially available. Such devices operate to derive an alarm signal upon an increase in temperature to a predetermined level. With such redundancy, a total failure not detected at surveillance network 54 and readout 110 resulting from a defective ionization detector 30' would be detected, although in an expanded time frame, to achieve shunt tripping at switching and control function 100. This form of redundancy is desirable in many installations where ultimate failure may result in very high cost or danger to human life.

Figure 4:
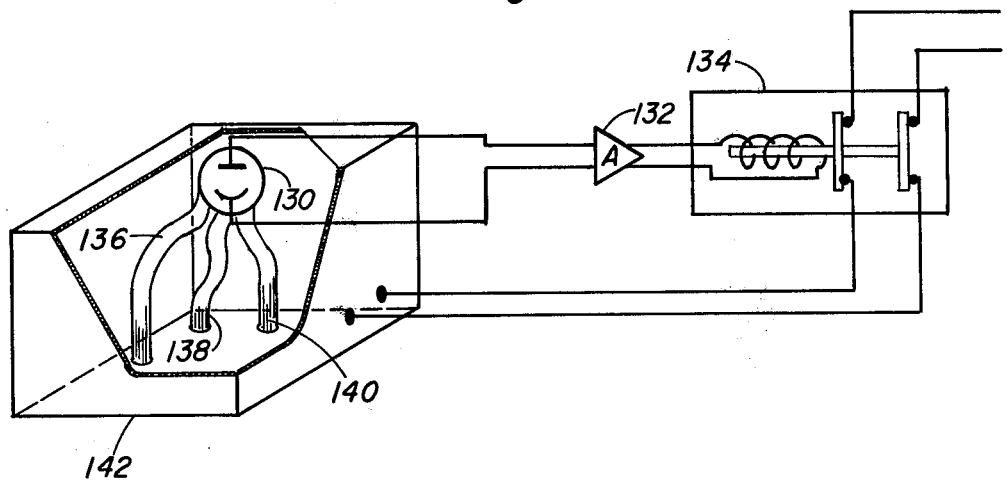
FIG. 4 is a schematic representation of an optical embodiment of the invention.

FIG. 4 illustrates another embodiment of the invention wherein a photosensitive component such as a photoelectric cell or a solid state photosensitive component such as a photodiode or discrete components such as cadmium type photocells are employed as the fault sensor. Light generated by the arcing fault is transmitted to such a photoresponsive device, as is represented at 130. In this regard, note that cell 130, when responding to light flux, generates a signal which is transmitted through an amplification stage 132, the output from which serves to energize a relay driven shunt switch, represented generally at 134. To provide for assured and more rapid conveyance of the light emanating from an arcing fault, fiber optics may be utilized, for instance, those fiber optic bundles represented at 136–140, extending to points of probable fault failure. Additionally, to enhance the receptivity of the cell 130 to such light generation, mirror surfaces (not shown) may be located along a side of a container or enclousre 142 disposed on a side of the electrical equipment being monitored which is opposite that side at which cell 130 is located. With such an arrangement, higher arc light flux quantities are generated to more quickly activate the cell. Of course, it may be observed, that the response rates of cells as at 130 are very high characteristically and the rate of light transmission from the point of fault arcing is, of course, essentially instantaneous. Fiber optic bundles for use in such situations are known and available from such sources as Dolan-Jenner Industries, Inc. of Melrose, Mass.

Figure 5:
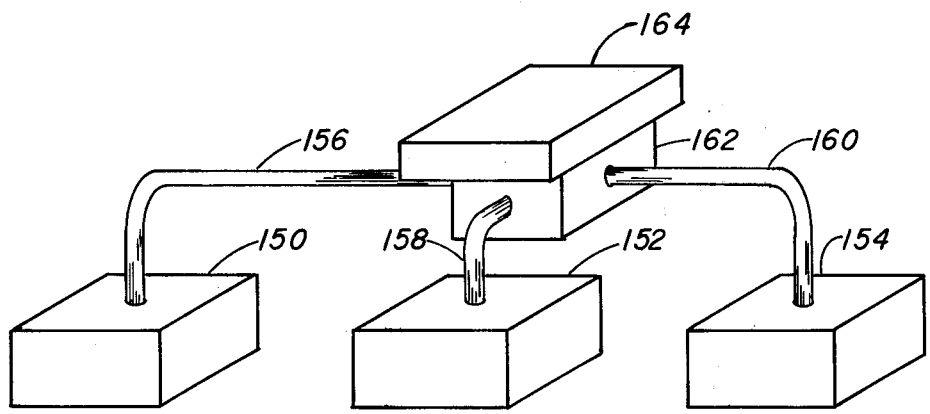
FIG. 5 is a schematic representation of still another embodiment of the invention using an ionization detector.

FIG. 5 reveals still another embodiment for the ionization detector arrangement. In this embodiment, three cabinets for retaining electrical components are revealed at 150–154. From the upward portion of each cabinet extend tubes shown, respectively, at 156–160, which lead to a manifold chamber 162. Tubes or conduits 156–160 are arranged in gas-tight connection between manifold 160 and the noted cabinets and, as discussed earlier, the cabinets are maintained in a normally closed or environment securing orientation. An ionization detector, represented generally by the block 164, extends into manifold 162, and aerosols as well as ionized matter are permitted to flow through the noted tubes into manifold 162 to achieve alarm response. It is understood, of course, that the preferred embodiment wherein a sensor is provided within each separate cabinet provides a more rapid and effective response.

As an example of the speed of response of the ionization detectors to an arc type fault, a steel cabinet was provided having a width of 30 inches, a depth of 30 inches and a height of 72 inches. At the top surface of the cabinet was mounted an ionization detector. In particular, the noted Pyrotronics Detector model DI-S. The output from this detector was coupled with the above identified Pyrotronics control panel, model CR-1. This test arrangement is revealed in FIG. 6 in schematic fashion. Note, for instance, that the cabinet is revealed at 170 in box form, while the ionization detector is revealed at 172 in phantom. Control wires as at 174 lead to an ionization control panel 176 which may be affixed to cabinet 170 or other convenient location. From control panel 176, control wires 178 lead to a main breaker switch 180. Leading into switch 180 is an incoming main power lead 182 and extending therefrom at 184 is a feeder conductor which leads to the cabinet of a conventional transformer-type arc welder shown at 186. The leads from welder 186 are shown at 188 leading to a welding fixture 190 within cabinet 170. This fixture was utilized to strike an arc, thereby simulating an insipient stage fault. Also incorporated with breaker switch 180 were control features including a timing device which indicated the elapsed time from the striking of an arc at 190 to the point in time where power to the welder 186 would be cut off by the main breaker components at 180. Accordingly, with the arrangement, upon the formation of the arc at the bottom surface of the cabinet, a timing system was provided which automatically was actuated to indicate elapsed sensing time as determined by the receipt of a signal from the detector.

Figure 6:
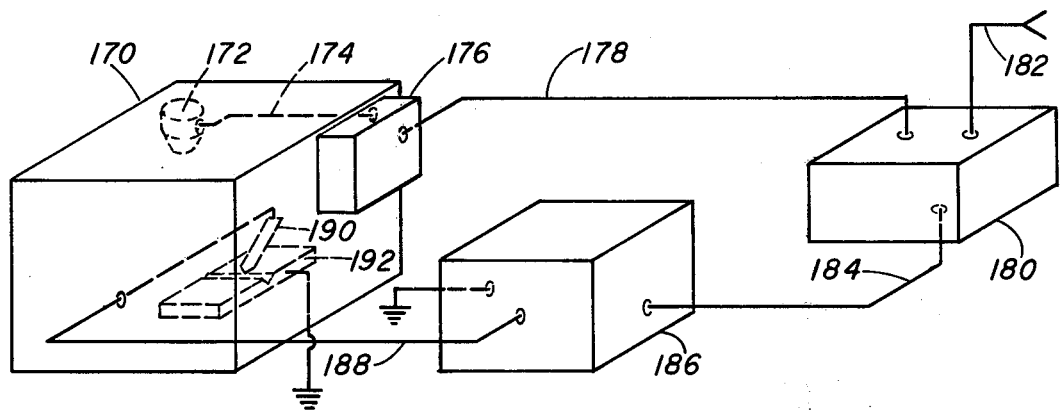
FIG. 6 is a schematic representation of a test arrangement conducted in connection with the invention.
Figure 7:
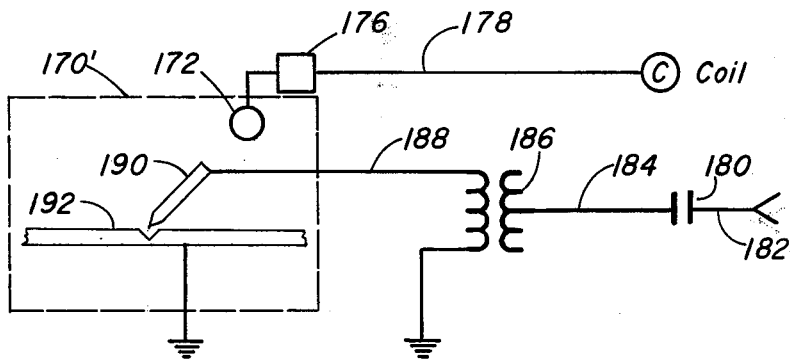
FIG. 7 is a typical, single line schematic drawing of components of the test arrangement of FIG. 6.

Looking to FIG. 7, a single line diagram corresponding to the arrangement of FIG. 6 is revealed. Here, the cabinet at 170 is shown in dashed fashion at 170' and, where appropriate, identical components are labeled with the same numeration as shown in FIG. 6. Note that incoming main power from line 182 passes a switch 180 and is directed through a transformer-type electric welder 186 to welding component 190. As noted above, an arc is struck to a steel plate as at 192 which, in turn, is coupled to ground. Upon striking the arc to the piece of steel 192 within the cabinet, elapsed sensing time of about 3 seconds were observed with the doors of the cabinet being opened to about one-half their extent. The welding device utilized was a Sears and Roebuck Company model 113.202450 sold under U.S. Pat. No. 3,523,272. The very rapid sensing and response time exhibited by the test setup serves to demonstrate the capability of the preferred embodiment of the invention to react within a time frame adequate to achieve detection and response within the period of incipient fault generation.

The methods disclosed herein for detecting may be modified without departing from the scope of the invention. In the prior art the fault sensor is normally an electrical component such as a current transformer in the ground return path or a zero sequence current transformer around the phase legs. These prior art sensors have been used to directly signal a solenoid trip device or motor operator which, in turn, trips the switch or circuit breaker protecting the electrical equipment. In some cases the sensors have activated intermediate or interposing relays which then signal or provide power to the solenoid, motor or other electric operator to try the circuit breaker or switch. The signals from the fault sensors of the present invention may be coupled to any of the different types of relays, switches or control circuits commercially available depending upon the particular application.

Because the fault sensor of the present invention does not measure current or voltage it has the further flexibility of being able to use an external source of power for activating the fault sensor and related equipment. By using an external source of power the fault sensor's connection to the protected circuit need be only at the circuit breaker, switch or other circuit interrupter.

Other features may be incorporated along with the ionization detector, heat sensor, photocell such as the above-noted indicating lights, current relays, potential transformers, timing relays and timing devices having indicator pointers which can be arranged and utilized to indicate the magnitude and duration of the fault prior to the detector initiating the tripping of the protective device. In addition, depending upon the electrical components being protected, it may as above-discussed, be desirable to combine two of the fault sensors in the system. For example, the fiber optic and photoresponsive sensors could be used for monitoring specific circuits while the ionization sensor keeps an overall "watch" on the entire enclosure.

By utilization of the system disclosed herein, the problems outlines in "The Impact of Arcing Ground Faults on Low-Voltage Power System Design" published by General Electric are substantially avoided. As pointed out in that booklet, at pages 4 and 5:

. . .In essence, the objective is to limit the flow of accidental ground currents in both time duration and magnitude, to levels of a few milliamperes, considered to be non-lethal to the human body. Electrical service to hospital operating rooms for instance, oftentimes rely on this form of grounding.
. .

Such a low level of ground fault current can not be attained in the usual low-voltage system, where just the normal charging ground current can easily exceed the 100 mill-amps level. A special form of protection to be applied at the branch circuit level, characteristically the 20A or 30A single pole breaker or fuse in conjunction with isolating transformers and monitoring equipment, is promoted to provide such personnel safety grounding. The effectiveness of such protection is presently under active deliberation as is the alternative of emphasizing the need for a low impedance ground return circuit.

The system of this invention assumes that the indication of the electrical fault is an arcing between phases or from phase to ground. And, moreover, that arcing causes the formation of ionized particles, heat, light and an increase in pressure. The pressure rise requires a generally closed volume for the sensor.

Arcing faults may be caused from various sources including cable insulation deterioration, temperature elevation and low level current. It is the purpose of the invention to sense and properly interrupt an arcing ground or phase to phase fault at an early stage of the problem before it escalates into more severe forms of arcing faults or before it inflicts severe damage to equipment or personnel and, optionally, given an aduio or visual alarm of which many types are commercially valuable.

Variations in the process and apparatus as disclosed in this invention will be obvious to one skilled in the art and such variations are intended to be included within this invention.

We claim:

1. A process for detecting at an incipient stage thereof, phase-to-phase and phase to ground faults characterized by arcing and generated in an enclosure configured and dimentioned to provide a volumetric capacity substantially only for retaining select electrical power distribution and regulation components within a normally enclosed and stable environment of atmospheric air, said enclosure being situate at a predetermined location within a power input system wherein electrical circuits extend in power supply relationship into said enclosure and are coupled electrically with said components, comprising the steps of:

monitoring the said atmospheric air environment only of said enclosure by the surveillance thereof with ionization chamber detection means, the presence of said arcing characterized fault derived ionized matter and subsequently generated particulate matter within said enclosure altering a known electrical parameter thereof from a first to a second condition to sense the said incipient stage of a said fault;

generating an electrical signal in response to the said ionization chamber detection means electrical parameter alteration to said second condition;

transmitting said generated electrical signal to means for opening the said electrical circuit coupled to said component at which said fault occurs; and opening the said electrical circuit to halt the flow of current therewithin to said component at which said fault occurs in response to said signal transmitted to said means for opening said electrical circuit.

2. The process of claim 1 including the steps of providing a first visible indicia that said surveillance is being carried out by said ionization chamber means; providing a second visible indicia of said parameter alteration sensing the presence of a said fault; and providing a third indicia when said surveillance derived electrical parameter is returned from said second condition to said first condition.

3. The process of claim 1 including steps of:

simultaneously monitoring the said atmospheric air environment of said enclosure for a temperature condition thereof equaling or exceeding a predetermined level;

altering a select electrical parameter in response to said condition;

generating an electrical signal in response to said select electrical parameter alteration; and transmitting said electrical signal to said means for opening the electrical circuit containing said fault.

4. A system for detecting, at an incipient stage thereof, arc characterized phase-to-phase and phast-to-ground faults generated with electrical power distribution and regulation components at a given location within a power supply system, comprising:

enclosure means configured for retaining select said electrical power distribution and regulation components within a normally enclosed environment of atmospheric air and situate at said given location;

monitoring means communicating with said enclosure environment of atmospheric air and including ionization chamber detection means operative to alter a known electrical parameter from a clear condition to a signal condition in response to the arc characterized fault-derived ionized matter and subsequently generated particulate matter within said environment;

shunt means actuable to divert the supply of said electrical power to said enclosure means retained distribution and regulation components to provide a cessation of the effects of a said fault; and control means responsive to the presence of said electrical parameter signal condition for actuating said shunt means.

5. The system of claim 4 in which:

said ionization chamber detection means is situate within said enclosure means.

6. The system of claim 4 in which said monitoring means includes at least one hollow tube extending from a said enclosure means to said ionization chamber detection means, access of said particulate and/or ionized matter with said detection means being provided by said tube.

7. The system of claim 4 in which said control means includes relay actuator means responsive to said signal condition to actuate said shunt means.

8. The system of claim 4 in which said control means includes:

first visible indicia means responsive to the input of operational power to said monitoring means for providing a perceptible output corresponding with the monitoring performance thereof;

second indicia means responsive to the presence of said signal condition for deriving a perceptible alarm output; and third indicia means for providing a perceptible output in response to a transition of said monitoring means from said signal condition to said clear condition.

9. The system of claim 4 in which said monitoring means includes heat detector means, situate within said enclosure means and configured to derive a said signal condition when said atmospheric air environment exhibits a temperature equaling or exceeding a perdetermined level.

10. The system of claim 4 in which at least one surface of said enclosure means is specular and said monitoring means includes at least one photo-responsive component configured to derive a said signal condition in response to arcing induced by a said fault.

11. The system of claim 10 in which said monitoring means includes fiber optic bundle means extending from said photo-responsive component to regions of said enclosure means predetermined as prone to exhibit occurances of a said fault.

* * * * *